(12) United States Patent
Nakayama

(10) Patent No.: US 6,423,150 B1
(45) Date of Patent: *Jul. 23, 2002

(54) METHOD FOR REMOVING RESIN

(75) Inventor: Yasuharu Nakayama, Kanagawa (JP)

(73) Assignee: Kansai Paint Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/453,967

(22) Filed: Dec. 3, 1999

(30) Foreign Application Priority Data

Dec. 3, 1998 (JP) ............................. 10-376208

(51) Int. Cl.$^7$ ................................................ B08B 7/04
(52) U.S. Cl. ............................. 134/10; 134/3; 134/28; 134/38; 430/281
(58) Field of Search ................. 134/28, 3, 38, 134/10; 430/281.1; 524/211, 500; 530/391.1; 209/11

(56) References Cited

U.S. PATENT DOCUMENTS 3,513,125 A * 5/1970 Kehr ........................ 260/47

6,197,124 B1 * 3/2001 Nakayama ................... 134/38

* cited by examiner

*Primary Examiner*—Randy Gulakowski
*Assistant Examiner*—Gentle E. Winter
(74) *Attorney, Agent, or Firm*—Rader, Fishman, & Grauer, PLLC

(57) ABSTRACT

Resin solid matter having a chemical structure represented by the following chemical formula (1)

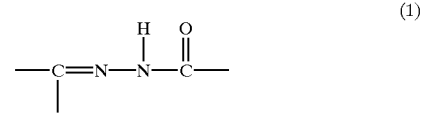

is contacted with a mixture (A), which contains (a) an acidic compound and (b) water as essential components, and which does not dissolve the resin solid matter, to thereby break the bonds in the chemical structure of the above formula (1). Thereafter, the resultant resin solid matter is removed from a base material by a solvent, whereby both of the base material and the removed resin can be recycled, and the solution for removing the resin can be repeatedly used.

18 Claims, No Drawings

METHOD FOR REMOVING RESIN

FIELD OF THE INVENTION

The present invention relates to a removal of resin solid matter. More particularly, the present invention is concerned with recycling of materials, wherein resin solid matter stuck on a base material is removed, so that not only the base material but also the removed resin solid matter can be recycled.

BACKGROUND OF THE INVENTION

Recently, recycling of materials is the most important task to be achieved internationally. The presence of solid matter stuck on materials, such as paint, print, an adhesive material and the like, mainly causes obstruction of realizing the material recycling.

The present inventor has previously conducted studies with a view toward developing a method for removing such solid matter stuck on a base material and recycling the base material, and found that the solid matter can be easily removed by a method in which paint, print, an adhesive material or like is made from a resin having a chemical structure of formula (1), and then, solid matter made of the above resin is contacted with mixture (A) which contains acidic compound (a) and water (b) as essential components and optionally solvent (c).

SUMMARY OF THE INVENTION

However, the above method poses new problems in that the generated waste liquid causes environmental pollution.

The present inventor has conducted studies with a view toward, for minimizing or eliminating the above pollution problems, developing a method for extending the period of time when the mixture (A) can be used as long as possible or semipermanently, and further, a method for recycling the removed resin solid matter per se. As a result, it has been found that the problem is solved by dissolving and removing the resin solid matter having a chemical structure of formula (1) in two steps described below, and the present invention has been completed.

Specifically, the resin solid matter having a chemical structure of formula (1) is first contacted with mixtures (A), to thereby break the bonds in the chemical structure of formula (1), wherein the resin does not dissolve in mixture (A). Then, the resin solid matter in which the bonds are broken is contacted with a solvent, to thereby dissolve and remove the resin solid matter, wherein the resin dissolves in the solvent.

By the method of the present invention, mixture (A) used for the breaking the chemical bonds in the chemical structure of formula (1) is not contaminated with the resin, so that it is possible to remarkably extend the period of time that mixture (A) can be used. Further, the resin solution resulting form dissolution of the resin solid matter in the solvent also contains only a little contamination, such as an acid. Therefore, the disposal of this solution is easy.

When the resin solid matter is a resin cured by a cross-linking agent, in the first step of contacting with mixture (A), the cross-linking agent can be solely dissolved in mixture (A) simultaneously with breaking the crosslinkage in the resin. In this case, the resin solution resulting form dissolution of the resin solid matter in a solvent in the second step does not contain the cross-linking agent. Therefore, the resin can be reused simply by removing the solvent from the resin solution.

When the above cross-linking agent is hydrophilic, mixture (A) can be used in the form of a solution containing a major component of water. Therefore, this case is advantageous from the viewpoint of the safety.

When the above cross-linking agent is carbohydrazide, the cross-linking agent dissolved in mixture (A) undergoes decomposition by oxygen in the air or an oxidant. Therefore, in this case, mixture (A) can be used semipermanently.

The present invention is directed to a method for removing a resin solid matter having a chemical structure represented by the following chemical formula (1):

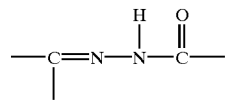

by having the resin solid matter contacted with a solvent after breaking the structure in the chemical formula (1) by having the resin solid matter contacted with a mixture (A), which contains an acidic compound (a) and water (b) as essential components, wherein the resin solid matter does not dissolve in mixture (A). In this case, the method according to the present invention, the mixture (A) may further contain an organic solvent (c).

The resin solid matter having a chemical structure represented by the above chemical formula (1) may be a substance obtained by a reaction between a carbonyl group-containing compound and a hydrazide group- or semicarbazide group-containing compound. In addition, the resin solid matter having a chemical structure represented by the above chemical formula (1) may be a substance obtained by a reaction between a carbonyl group-containing resin and a cross-linking agent which contains two or more hydrazide groups or semicarbazide groups.

PREFERRED EMBODIMENT OF THE INVENTION

With respect to the resin solid matter which can be used in the method of the present invention, there is no particular limitation as long as a resin constituting the resin solid matter has a chemical structure represented by the above formula (1). As specific examples of resin solid matter, there has been known a resin solid matter having a chemical structure represented by the above formula (1); a cured resin obtained by a reaction between a carbonyl group-containing resin and a hydrazide group- or semicarbazide group-containing resin; a cured resin obtained by cross-linking a carbonyl group-containing resin with a polyhydrazide compound or polysemicarbazide compound; or a cured resin obtained by cross-linking a hydrazide group- or semicarbazide group-containing resin with a polycarbonyl compound. These reactions are reported in a number of literatures (for example, see "The Chemistry of Amides" PAR[T] TWO (INTERSIENCE PUBLISHERS), issued in 1970, Chapter 10, pp. 515–600). Uses of these resins can be paint, print, adhesive material, resin treatment, an unsupported shaped article and the like. Further, in accordance with the uses, a pigment, an extender pigment, other resins, a plasticizer, a thickener and the like may be added.

Preferred resin solid matter is a resin cured by a cross-linking agent. In this case, when the resin solid matter is contacted with mixture (A) in the first step, the cross-linking agent can be solely dissolved in mixture (A) simultaneously with breaking the crosslinkage in the resin. In addition, the resin solution resulting from dissolution of the resin solid matter in a solvent in the subsequent second step does not contain the cross-linking agent. Therefore, the resin can be reused simply by removing the solvent from the resin solution.

More preferred resin solid matter is a cured resin in which the above cross-linking agent is hydrophilic. In this case, mixture (A) can be used in the form of a solution containing a major component of water. Therefore, this case is advantageous from the viewpoint of the safety.

Most preferred resin solid matter is a cured resin in which the above cross-linking agent is carbohydrazide. In this case, the cross-linking agent dissolved in mixture (A) can be decomposed by oxygen in the air or an oxidant, and therefore, mixture (A) can be used semipermanently.

Acidic compound (a) used in mixture (A) in the method of the present invention is used as a catalyst in the decomposition reaction of the chemical structure of the above formula (1). With respect to the acidic compound (a), there is no particular limitation, and either an inorganic acid or an organic acid can be used. The acidic compound having a high acidity can remarkably promote the decomposition reaction. Specific examples of acidic compounds (a) can be those described below.

Monobasic acids may include, for example: aromatic monobasic acids, such as benzenesulfonic acid, dodecylbenzenesulfonic acid, toluenesulfonic acid, benzoic acid, methylbenzoic acid or p-t-butylbenzoic acid; saturated or unsaturated fatty acids having 1 through 24 carbon atoms, such as formic acid, acetic acid, lactic acid, propionic acid, acrylic acid, butylic acid, caproic acid, caprylic acid, pelargonic acid, capric acid, undecanoic acid, lauric acid, myristic acid, palmitic acid, stearic acid, cyclohexanecarboxylic acid, 9-decenoic acid, oleic acid, eleostearic acid, elaidic acid, brassidic acid, linoleic acid, and linolenic acid; and hydroxycarboxylic acids (oxy-acids), such as dimethylolpropionic acid, oxypivalic acid, 12-hydroxydodecanic acid, 12-hydroxystearic acid, ricinolic acid, para-oxybenzoic acid, salicylic acid and 4,4-bis(4'-hydroxyphenyl)pentanoic acid. In addition, as monobasic acids, lower alkyl esters or glycerides of the above monobasic acids and cyclic ester compounds including lactones, such as ε-caprolactone or γ-valerolactone, can be used.

Dibasic acids may include aromatic dicarboxylic acids and anhydrides thereof, such as terephthalic acid, isophthalic acid, phthalic acid, naphthalenedicarboxylic acid, 4,4'-biphenyldicarboxylic acid, diphenylmethane-4,4'-dicarboxylic acid; alicyclic dicarboxylic acids and anhydrides thereof, such as hexahydroisophthalic acid, hexahydroterephthalic acid, hexahydrophthalic acid and tetrahydrophthalic acid; aliphatic dicarboxylic acids and anhydrides thereof, such as adipic acid, sebacic acid, suberic acid, succinic acid, glutaric acid, maleic acid, chloromaleic acid, fumaric acid, dodecanoic acid, pimelic acid, azelaic acid, itaconic acid, citraconic acid and a dimer acid; and lower alkyl esters, such as a methyl ester and an ethyl ester, of the above dicarboxylic acids.

Examples of polybasic acids include aromatic polybasic acids and anhydrides thereof, such as phthalic acid, isophthalic acid, telephthalic acid, 4,4'-biphenyldicarboxylic acid, 2,6-naphthalenedicarboxylic acid, tetrachlorophthalic acid, 4,4'-diphenylmethanedicarboxylic acid, trimellitic acid, trimesic acid, and pyromellitic acid; saturated or unsaturated aliphatic polybasic acids and anhydrides thereof, such as succinoic acid, glutaric acid, adipic acid azelaic acid, sebacic acid, dodecanedicarboxylic acid, suberic acid, pimelic acid, meleic acid, fumaric acid, itaconic acid, brassylic acid, and citraconic acid; alicyclic dicarboxylic acids and anhydrides thereof, such as hexahydroteraphthalic acid, hexahydroisophthalic acid, hexahydroterephthalic acid, hexahydrotrimellitic acid, methylhexahydrophthalic acid, methylhexahydroterephthalic acid, Δ1-tetrahydrophthalic acid, Δ2-tetrahydrophthalic acid, Δ3-tetrahydrophthalic acid, Δ4-tetrahydrophthalic acid, Δ1-tetrahydroisophthalic acid, Δ2-tetrahydroisophthalic acid, Δ3-tetrahydroisophthalic acid, Δ4-tetrahydroisophthalic acid, Δ1-tetrahydroterephthalic acid, Δ2-tetrahydroterephthalic acid, methyltetrahydrophthalic acid, endomethylenetetrahydrophthalic acid, and methylendomethylenetetrahydrophthalic acid; hexachloroendomethylenetetrahydrophthalic acid; and anhydrides of the above polybasic acids and ester-forming reactive derivatives thereof, such as lower alkyl esters having 1 to 6 carbon atoms (particularly, dimethyl ester).

Examples of inorganic acids include hydrochloric acid, sulfuric acid, phosphoric acid, phosphorous acid, nitric acid, and anhydrides and esterification products of these acids.

The above acidic compounds may be used individually or in combination.

Among the above compounds, preferred ones are formic acid, acetic acid, benzoic acid, acrylic acid, methylsulfonic acid, benzenesulfonic acid, toluenesulfonic acid, dodecylbenzenesulfonic acid, dodecylsulfonic acid, sulfuric acid, hydrochloric acid, phosphoric acid, nitric acid and the like.

The amount of acidic compound (a) used in mixture (A) is generally in the range of from 0.01 to 99.99% by weight, preferably from 0.1 to 95% by weight, more preferably from 0.5 to 70% by weight, based on the weight of mixture (A). When the amount of acidic compound (a) used is less than 0.01% by weight, the decomposition rate disadvantageously becomes low. On the other hand, when the amount of acidic compound (a) used is more than 99.99% by weight, the content of the other essential component inevitably becomes small, and hence, the decomposition rate of the coating film disadvantageously becomes low.

The amount of water (b) used in mixture (A) is generally in the range of from 0.01 to 99.99% by weight, based on the weight of mixture (A). However, in many cases, the resin used is not hydrophilic generally, and thus, for preventing dissolution of such a resin in mixture (A), it is preferred that the amount of water (b) used is more than above-mentioned amount. Further, a danger can also be avoided due to a large amount of water. The amount of water (b) used is preferably from 5 to 99.99% by weight, more preferably from 20 to 95% by weight. The above-mentioned amount of the water used may include the moisture content of the air or a base material.

Further, in the present invention, for promoting the penetration of the mixture (A) into the resin solid matter, a general organic solvent may be added to mixture (A). With respect to the amount of the organic solvent added, there is no particular limitation; however, this amount can be generally 99.99% by weight or less, preferably 90% by weight or less, more preferably 60% by weight or less, based on the weight of mixture (A). In general, the resin applied is likely to be dissolved in an organic solvent. Therefore, when the content of the organic solvent in mixture (A) is larger, the resin recovery ratio becomes lower. Thus, the amount of the organic solvent used is advatageously 99.8% by weight or less, based on the weight of mixture (A).

Examples of organic solvents (c) include hydrocarbon solvents, such as pentane, hexane, octane, cyclohexane, benzene, toluene, xylene, ethylbenzene, cumene, butylbenzene, diethylbenzene, cyclohexene, petroleum ether, petroleum benzine, kerosine, and turpentine oil; hydrocarbon halide solvents, such as chloroform, carbon tetrachloride, dichloroethane, trichloroethylene, propyl chloride, chlorobenzene, dichlorobenzene, trichlorobenzene, chlorotoluene, and trichlorofluoroethane; alcohol solvents, such as methanol, ethanol, propanol, butanol, pentanol, pentyl alcohol, hexanol, heptanol, octanol, allyl alcohol, benzyl alcohol, cyclohexanol, methylcyclohexanol, diacetone alcohol, fusel oil, ethanediol, butanediol, glycerol, ethylene glycol, propylene glycol, butylene glycol, diethylene glycol, dipropylene glycol, and triethylene glycol; ether solvents, such as diethyl ether, dipropyl ether, dibutyl ether, dihexyl ether, ethyl vinyl ether, butyl vinyl ether, anisole, propylene oxide, epoxybutane, dioxane, tetrahydrofuran, tetrahydropyran, diethoxyethane, 1,2-dibutoxyethane, diethylene glycol dimethyl ether, diethylene glycol diethylene ether, acetal, ethyl ketal, ethylene glycol monomethyl ether, ethylene glycol monoethyl ether, ethylene glycol monohexyl ether, propylene glycol monomethyl ether, propylene glycol monoethyl ether, propylene glycol monopropyl ether, ethylene glycol monobuthyl ether, propylene glycol monobutyl ether, 3-methyl-3-methoxypropane, diethylene glycol monomethyl ether, and triethylene glycol monomethyl ether; ketone solvents, such as acetone, methyl ethyl ketone, pentanone, hexanone, methyl isobutyl ketone, heptanone, acetonylacetone, diisobutyl ketone, isophorone, cyclohexanone, methylcyclohexane, and acetophenone; ester solvents, such as methyl formate, ethyl formate, propyl formate, butyl formate, methyl acetate, ethyl acetate, propyl acetate, butyl acetate, pentyl acetate, 3-methoxybutyl acetate, cyclohexyl acetate, butyl propionate, a butyrate, dietheyl malonate, ethylene glycol monoacetate, an ethylene glycol ester, diethylene glycol monoacetate, diethyl carbonate, ethylene carbonate, a borate, and a phosphate; nitrogen-containing compound solvent, such as nitromethane, nitropropane, nitrobenzene, ancetonirile, triethylamine, diethylamine, aniline, pyridine, N-methylformamide, N, N-dimethylformamide, acetamide, N,N-dimethylacetamide, 2-pyrrolidone, N-methylpyrrolidone, ε-caprolactam, and morpholine; and sulfer-containing compound solvents, such as carbon disulfide, dimethyl sulfoxide, and sulfolane.

Among the above solvents, preferred is a solvent in which both of water and a resin can be dissolved to some extent. However, the above solvents can be used in combination, and hence, the balance between the solubility of water and that of the resin in the solvent can be adjusted by mixing the solvents. It is preferred that the final adjustment of mixture (A) is performed by changing the mixing ratio of water and a solvent so that the resin is not dissolved in mixture (A).

In the method of the present invention, with respect to the method of contacting the resin solid matter with mixture (A), there is no particular limitation. The resin solid matter may be immersed in the solution of mixture (A), or the resin solid matter may be contacted with mixture (A) in the gaseous phase. With respect to the contact temperature, there is also no particular limitation; however, generally, the temperature is in the range of ordinary room temperature to 200° C.

After the chemical bonds in the chemical structure of formula (1) are broken by the contact with mixture (A), the resin solid matter is removed together with a base material and contacted with a solvent, so that the resin is dissolved. As the solvent used in this step, the solvent used in mixture (A) can be used. Any solvent in which the resin is dissolved can be used. When the removed resin is reused, for facilitating the resolidification of the resin, a solvent having a boiling point of ordinary room temperature to 200° C. is advantageously used. Further, when the removed resin is incinerated, a solvent free of sulfur is preferred.

The primary object of the method of the present invention is to remove the resin component stuck on a base material while minimizing environmental pollution for facilitating the recycling of the base material; however, the method of the present invention can also be applied in the treatment of resin solid matter containing no base material.

EXAMPLES

Hereinbelow, the present invention will be described in more detail with reference to the following Examples.

Resin Production Example 1

In a flask was placed 90 parts by weight of propylene glycol monomethyl ether, followed by heating to 110° C. Then, to the content of the flask was added a mixture having the following composition drop over 2 hours:

Acrylic acid: 10 Parts by weight

Diacetone acrylamide: 140 Parts by weight

Styrene: 107 Parts by weight n-Butyl acrylate: 193 Parts by weight

Azobisisobutyronitrile: 9 Parts by weight.

After completion of the addition, the resultant mixture was aged or matured for 1 hour, and then, 2 parts by weight of Per-Butyl O (polymerization initiator, manufactured and sold by Nippon Oil & Fats Co., Ltd.) was added thereto in five divided portions for one hour. The resultant mixture was further aged or matured at 110° C. for 2 hours. After cooling, 225 parts by weight of isopropyl alcohol and 16 parts by weight of triethylamine were added to the mixture, followed by addition of deionized water while stirring, to thereby effect an emulsification. Then, the solvent was removed from the resultant emulsion under a reduced pressure, to thereby obtain emulsion A having a solids content of 47.6% and a pH of 9.45.

Resin Production Example 2

In a flask was placed 90 parts by weight of propylene glycol monomethyl ether, followed by heating to 110° C. Then, to the content of the flask was added a mixture having the following composition drop by drop over 2 hours.

Acrylic acid: 10 Parts by weight

Diacetone acrylamide: 135 Parts by weight

Methyl methacrylate: 14 Parts by weight

Ethyl acrylate: 91 Parts by weight n-Butyl acrylate: 110 Parts by weight

Hydroxyethyl methacrylate: 90 Parts by weight

Azobisisobutyronitrile: 9 Parts by weight

After completion of the addition, the resultant mixture was matured for 1 hour, and then, 2 parts by weight of Per-Butyl O (polymerization initiator, manufactured and sold by Nippon Oil & Fats Co., Ltd.) was added thereto in five divided portions for 1 hour. The resultant mixture was further matured at 110° C. for 2 hours. After cooling, 22.5 parts by weight of isopropyl alcohol and 14 parts by weight of triethylamine were added to the mixture, followed by addition of deionized water while stirring, to thereby effect an emulsification. Then, the solvent was removed from the resultant emulsion under a reduced pressure, to thereby obtain emulsion B having a solids content of 30.7% and a pH of 8.27.

Coating Film Production Example 1

To 100 parts by weight of emulsion A obtained in Resin Production Example 1 was added 35% by weight of a titanium white paste having the solids content of 67.6%. Immediately before coating, to the resultant paint was added a solution prepared by dissolving 2 parts by weight of carbohydrazide in 15 parts by weight of water, and then, a polypropylene plate was coated with the resultant paint by the use of a bar coater of No. 48, followed by satisfactory drying (drying conditions are described in Example below), to thereby obtain coated plate (a).

Coating Film Production Example 2

Immediately before coating, to 100 parts by weight of emulsion A obtained in Resin Production Example 1 was added a solution prepared by dissolving 2 parts by weight of carbohydrazide in 15 parts by weight of water, and then, a polypropylene plate was coated with the resultant paint by the use of a bar coater of No. 48, followed by satisfactory drying, to thereby obtain coated plate (b).

Coating Film Production Example 3

To 100 parts by weight of the emulsion obtained in Resin Production Example 2 was added 22.7 parts by weight of a titanium white paste having a solids content of 67.6%. Immediately before coating, to the resultant paint was added a solution prepared by dissolving 1.2 parts by weight of carbohydrazide in 10 parts by weight of water, and then, a polypropylene plate was coated with the resultant paint by the use of a bar coater of No. 60, followed by satisfactory drying, to thereby obtain coated plate (c).

Example 1

Each of the coated plates obtained in Coating Film Production Examples was immersed in mixture (A) described in Table 1 for a predetermined time, followed by washing with acetone. When the amount of the resin residue remaining on the coated plate after the immersion in mixture (A) is the closer to the theoretical coating amount (the theoretical value is about 97% when all cross-linking agent is dissolved), the degree of the contamination of mixture (A) with the resin dissolved is the smaller. When the coating does not remain after the immersion in mixture (A) and the subsequent washing with acetone, a separation of coating without contamination of mixture (A), which is an objective of the present invention, is achieved. Subsequently, the resin residue was subjected to heat treatment at 160° for 30 min. After this, when 100% resin can be dissolved and removed by washing with acetone, it is demonstrated that all of the cross-linking agent is dissolved in mixture (A) during the immersion in mixture (A) and the resin is not cross-linked again. Therefore, in this case, the removed resin can be reused.

TABLE 1

| | Examples | | | | | | | |
|---|---|---|---|---|---|---|---|---|
| | 1 | 2 | 3 | 4 | 5 | 6 | 7 | 8 |
| Coated plate used | (a) | (a) | (a) | (b) | (b) | (c) | (a) | (a) |
| Composition of mixture (A) | A-1 | A-1 | A-1 | A-1 | A-1 | A-2 | A-3 | A-4 |
| Immersion time (min.) | 20 | 30 | 30 | 20 | 60 | 30 | 30 | 40 |

TABLE 1-continued

| | Examples | | | | | | | |
|---|---|---|---|---|---|---|---|---|
| | 1 | 2 | 3 | 4 | 5 | 6 | 7 | 8 |
| Immersion temperature (° C.) | 80 | 80 | 60 | 80 | 80 | 60 | 80 | 60 |
| Residue (%) after immersion in mixture (A) | 94 | 95 | 95 | 94 | 95 | 97 | 97 | 96 |
| Residue (%) after immersion in mixture (A) at 160° C. for 30 min. and subsequent drying and washing with acetone | 2.5 | 0 | 24 | 35.1 | 0 | 5.0 | 6.3 | 7.7 |
| Residue (%) after immersion in mixture (A) and subsequent washing with acetone | 0 | 0 | 0 | 0 | 0 | 0 | 0 | 0 |

(Note)
Immersion liquid: A-1 (water/propylene glycol monopropyl ether (PGPE)/para-toluenesulfonic acid (PTS) = 75/20/5), A-2 (water/PGPE/PTS = 85/10/5), A-3 (water/propylene glycol monopropyl ether/PTS = 47/48/5), A-4 (water/PGPE/sulfuric acid = 78/20/2)

The present invention has effects such that resin solid matter stuck on a base material is removed, and the both of the base material and the resin solid matter can be recycled.

The disclosure of Japanese Patent Application No. 10-376208 filed Dec. 3, 1998, including specification, drawings and claims are herein incorporated by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A method for removing a resin solid matter having a chemical structure represented by the following chemical formula (1):

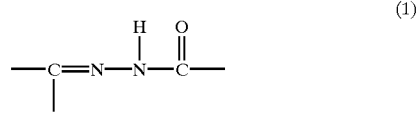

said method comprising:
contacting said resin solid matter with a mixture (A) which contains an acidic compound (a) and water (b) as essential components, to thereby break the bonds in the chemical structure of the above formula (1), wherein said resin solid matter does not dissolve in said mixture (A); and
removing the resultant resin by the contact with a solvent.

2. The method for removing a resin solid matter according to claim 1, wherein said mixture (A) further contains an organic solvent (c).

3. The method for removing a resin solid matter according to claim 1, wherein said resin solid matter having the chemical structure represented by the chemical formula (1) is a substance obtained by a reaction between a carbonyl group-containing compound and a hydrazide group- or semicarbazide group-containing compound.

4. The method for removing a resin solid matter according to claim 1, wherein said resin solid matter having the chemical structure represented by the chemical formula (1) is a substance obtained by a reaction between a carbonyl group-containing resin and a cross-linking agent which contains two or more hydrazide groups or semicarbazide groups.

5. The method for removing a resin solid matter according to claim 4, wherein said cross-linking agent is a hydrophilic compound.

6. The method for removing a resin solid matter according to claim 4, wherein said cross-linking agent is carbohydrazide.

7. The method for removing a resin solid matter according to claim 1, wherein said resin solid matter is a film which constitutes a paint coating film or a printing layer.

8. The method for removing a resin solid matter according to claim 1, wherein said resin solid matter is an adhesive layer.

9. The method for removing a resin solid matter according to claim 1, wherein said resin solid matter is a composite cured resin including a resin-treated product.

10. The method for removing a resin solid matter according to claim 1, wherein said resin solid matter constitutes a structure.

11. The method for removing a resin solid matter according to claim 2, wherein said resin solid matter having the chemical structure represented by the chemical formula (1) is a substance obtained by a reaction between a carbonyl group-containing compound and a hydrazide group- or semicarbazide group-containing compound.

12. The method for removing a resin solid matter according to claim 2, wherein said resin solid matter having the chemical structure represented by the chemical formula (1) is a substance obtained by a reaction between a carbonyl group-containing resin and a cross-linking agent which contains two or more hydrazide groups or semicarbazide groups.

13. The method for removing a resin solid matter according to claim 12, wherein said cross-linking agent is a hydrophilic compound.

14. The method for removing a resin solid matter according claim 12, wherein said cross-linking agent is carbohydrazide.

15. The method for removing a resin solid matter according to claim 2, wherein said resin solid matter is a film which constitutes a paint coating film or a printing layer.

16. The method for removing a resin solid matter according to claim 12 wherein said resin solid matter is an adhesive layer.

17. The method for removing a resin solid matter according to claim 2, wherein said resin solid matter is a composite cured resin including a resin-treated product.

18. The method for removing a resin solid matter according to claim 2, wherein said resin solid matter constitutes a structure.

* * * * *